Oct. 12, 1965    K. G. HALVORSEN    3,211,638
ELECTRODE ASSEMBLY

Filed Jan. 5, 1962    2 Sheets-Sheet 1

*INVENTOR.*
KENNETH G. HALVORSEN
BY *Robert M. Taylor, Jr.*
ATTORNEY

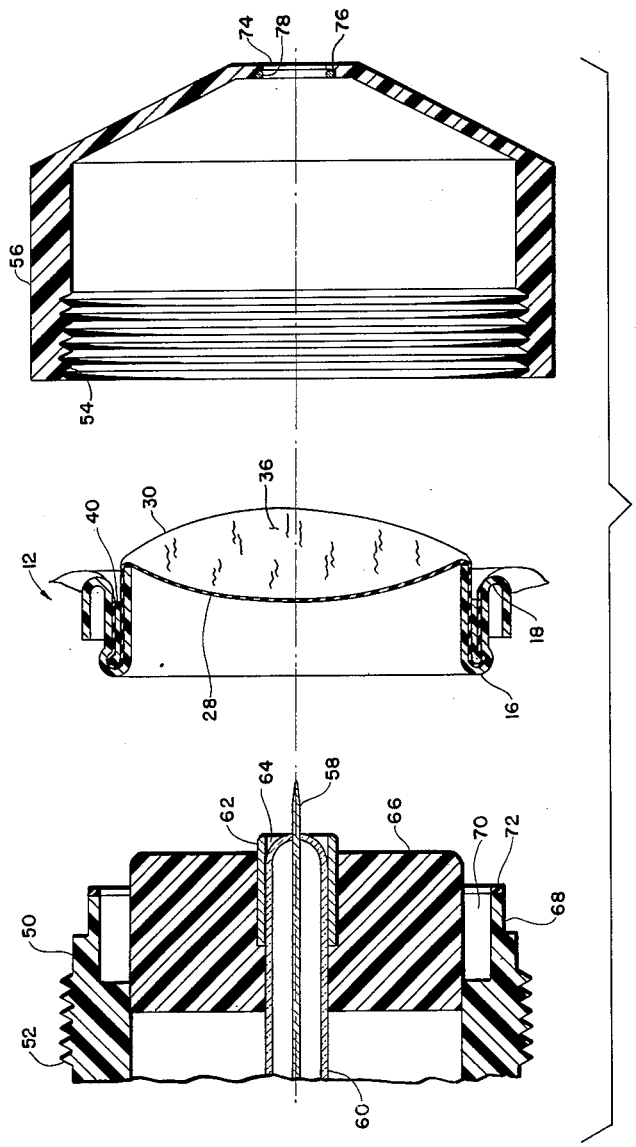

United States Patent Office 3,211,638
Patented Oct. 12, 1965

3,211,638
ELECTRODE ASSEMBLY
Kenneth G. Halvorsen, Fullerton, Calif., assignor to Beckman Instruments, Inc., a corporation of California
Filed Jan. 5, 1962, Ser. No. 164,457
4 Claims. (Cl. 204—195)

This invention relates to a method and apparatus for charging and recharging electrode assemblies and more particularly relates to an electrolyte capsule and an electrode assembly for use therewith.

A number of electrode assemblies are now commercially available which may be used to determine the partial vapor pressure of a particular gas in a liquid or gaseous medium. For example, if it is desired to continuously ascertain the partial pressure of oxygen in a liquid or gaseous medium, a polarographic electrode assembly has been provided in which an anode and a cathode are separated from the liquid or gaseous medium by a thin membrane that is permeable to oxygen but not to the other gases present in the medium. The cathode is generally formed of a platinum wire fused into a glass tube and the anode is formed of a silver tube or a band of silver foil wrapped around the tip end of the glass tube. A thin film of a suitable electrolyte for example, a gelled potassium chloride solution, electrolytically couples the anode and cathode and is held in place by the oxygen permeable membrane. The electrical current carrying capacity of the cell will vary in direct proportion to the quantity of oxygen passing through the permeable membrane and into the electrolyte. This current may be metered to give an indication of the partial pressure of oxygen in the medium.

Another electrode presently available is useful in determining the partial pressure of carbon dioxide in a liquid or gaseous medium. In this electrode assembly, a glass electrode replaces the cathode in the assembly described above while a silver-silver chloride reference electrode replaces the anode. The two half cells are electrolytically coupled by a thin film of a suitable electrolyte gel held in place by a thin, carbon dioxide permeable membrane. As the pH of the solution varies due to the carbon dioxide, a corresponding variation in potential occurs that is proportional to the log of the concentration of carbon dioxide in the gaseous sample being analyzed. This potential can be indicated directly on a meter calibrated in terms of $CO_2$ partial pressure.

In both of the electrode assemblies described above, the electrolyte space between the two electrically active elements is charged or filled with electrolyte by holding the electrode assembly in an upright position and delivering the electrolyte to the electrolyte space by means of a suitable dispensing container. The permeable membrane, for example, a thin polytetrafluoroethylene membrane which has been precut to a manageable size, is then pressed firmly over the central element and an elastic O-ring is used in conjunction with an annular notch in the electrode assembly housing to retain the membrane in position. The membrane is then trimmed with a razor blade or the like. The performance of this operation requires a considerable amount of training and a rather high level of manual dexterity as the components of the electrode assemblies are usually very small in size.

While the electrode assemblies formed by this charging method just described are entirely satisfactory in operation, the method itself is time consuming and requires a certain skill as pointed out previously. Since the electrode assemblies are suitable for use in many different environments, there will be many occasions where it is unlikely that someone having sufficient skill will be present, and many others where the economics of providing skilled labor will be prohibitive. In theory, the electrode assemblies should not require recharging for an extremely long time, but in practice the membrane often becomes cracked or broken, with the result that the electrolyte is fouled by the medium being tested or becomes dry due to evaporation. Electrolyte evaporation also occurs when the electrode assemblies are used in low humidity gaseous mediums. In these eventualities the electrode assembly has to be recharged with fresh electrolyte and in the first case must be provided with a new membrane.

If the electrode assembly is used in an environment where the partial pressure of a gas is a critical factor, it is obvious that in the event of a disabled electrode assembly it is desirable to recharge the electrode assembly as quickly as possible. As pointed out previously, the recharging operation presently used is time consuming even for a skilled person and thus not completely satisfactory. It is also desirable that the initial charging of the electrode assembly be simplified to the point where anyone can perform the operation with a minimum of instruction.

According to the present invention, it has now been found that an electrode assembly may be provided that is quick and easy to charge or recharge by an extremely rapid operation which requires little or no skill. This improved operation is obtained by providing a preassembled electrolyte containing capsule together with an electrode assembly adapted for use therewith. The permeable membrane comprises part of the capsule as does an easily ruptured plastic cup. When the capsule assembly is forced against the electrode assembly by an electrode cap that cooperates with the electrode assembly housing, the cup ruptures causing electrolyte to bridge the electrically active members and the membrane is stretched tightly over the cathode. The capsule and electrode assembly are simple and quick to use and may be provided at little or no more expense than the apparatus presently required.

It is therefore a primary object of the present invention to provide a gas-sensing electrode assembly and a recharge capsule for use therewith.

It is another object of the present invention to provide a recharge capsule for use with gas-sensing electrode assemblies.

It is also an object of the present invention to provide a method for charging or recharging electrode assemblies with electrolyte.

These and further objects and advantages of the invention will become more apparent upon reference to the following specification and claims and appended drawings wherein:

FIG. 3 is an exploded sectional view of the electrode assembly, recharge capsule, and electrode cap of the present invention prior to their assemblage as a single unit.

Figure 1:
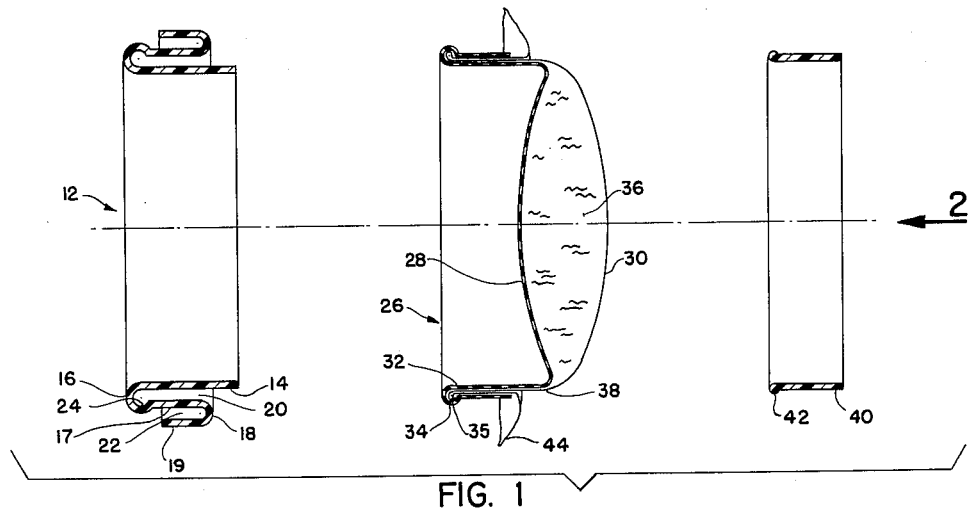
FIG. 1 is an exploded sectional view of the recharge capsule of the present invention.
Figure 2:
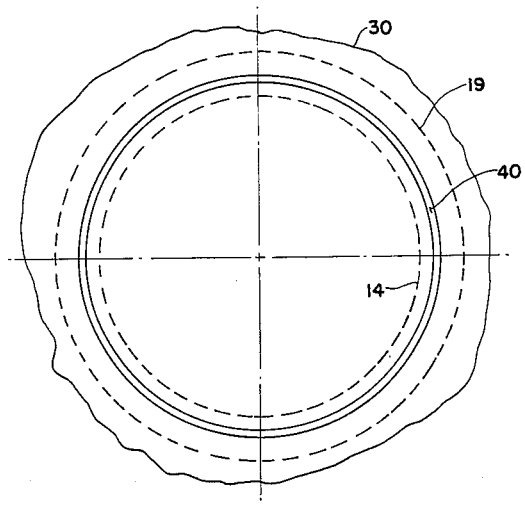
FIG. 2 is a plan view of the capsule of the present invention.

Referring now to FIGS. 1 and 2, there is shown a recharge capsule and electrode assembly suitable for determining the partial pressure of oxygen according to the present invention. A first ring generally indicated at 12 is made of any suitable material, for example, an epoxy resin, and is constructed with a first annular wall 14, a first generally U-shaped portion 16, a second annular wall 17, a second U-shaped portion 18, and a third annular wall 19. The annular walls 14, 17, and 19 together with the U-shaped portions 16 and 18 form a generally S-shaped cross section, leaving grooves 20 and 22. The groove 20 is preferably provided with an enlarged channel 24 at the bottom thereof for a purpose to be explained presently.

A vesicle generally indicated at 26 is composed of a cup 28 formed of a flexible material that is extremely fragile to impact, for example, a thin sheet of polystyrene, and a thin membrane 30, the membrane being permeable to the gas being tested. In the case of an oxygen sensing electrode assembly the membrane is preferably composed of polytetrafluoroethylene. The cup 28 is formed with a generally U-shaped rim portion 32, the rim portion 32 having a slightly enlarged portion 34 forming a channel 35 at the curved end for a purpose to be explained hereinbelow. The cup may be cast or punched or otherwise formed by any appropriate operation. The cup is filled, preferably to a height above its rim, with a suitable electrolyte 36, for example, gelled potassium chloride. The membrane 30 is positioned over the electrolyte 36 and may be joined with the cup 28 at 38 in any suitable fashion or a seal may be formed solely by the interaction of a second plastic or metal ring 40 provided with a beaded portion 42 and the cup 28.

In the assembly of the capsule, the ring 40 is brought into engagement with a portion 44 of the membrane 30 that overlaps the rim portion 32 of the cup 28. The ring 40 is then forced into the U-shaped rim portion until the beaded portion 42 of the ring is seated in the channel 35. The engagement of the bead portion 42 of the ring 40 with the walls of the channel 35 holds the overlapping portion 44 of the membrane 30 firmly in place, thereby preventing escape of electrolyte 36 from between the cup 28 and membrane 30. The vesicle-ring structure is then positioned against the ring 12 so that the U-shaped rim portion 34 of cup 28 is above the groove 20. The rim portion 32 is then forced into the groove 20 until the enlarged portion 34 seats in the channel 24, thus locking the cup in place.

Referring now to FIG. 3, there is shown an electrode assembly and electrode cap adapted for use with the above-described recharge capsule. The electrode assembly includes a housing 50, formed of any suitable material, for example, an epoxy resin, which is provided with screw threads 52 which cooperate with screw threads 54 of an electrode cap 56 which is also made of an epoxy resin or other suitable material. In the case of the oxygen electrode illustrated, the electrode assembly includes a pair of electrodes, an anode and a cathode, as the sensing elements.

The cathode of the electrode assembly is preferably a platinum wire 58 fused into a glass tube 60 as is well known to those skilled in the art. The anode of the electrode assembly is preferably a thin silver tube or band of silver foil 62 which surrounds the end of the glass tube 60 and forms an electrolyte space 64. The anode could also take the form of a silver wire helically wound around the glass tube. A suitable cement 66 is used to hold the anode and the cathode in proper position with respect to each other and to the housing 50. The housing 50 is provided with an annular extension 68 which cooperates with the cement 66 to form an annular recess 70. This recess 70 is adapted to receive the U-shaped portion 16 of the ring 12 of the recharge capsule when this capsule is forced against the electrode assembly. The annular extension 68 of the housing 50 is provided with a gasket 72, preferably of rubber, which forms a seal with the U-shaped portion 18 of the ring 12.

The electrode cap 56 is provided with an aperture 74 through which the cathode 58 may protrude when the cap and electrode assembly are screwed together. Around the inner circumference of the aperture 74 there is provided a recess 76 in which is seated an O-ring 78 made of rubber or any other suitable elastic material.

In assembling the complete sensing assembly, the recharge capsule is placed on the sensing end of the electrode assembly in such a manner that the fragile plastic cup 28 is in contact with the cathode 58. The electrode cap 56 is then slipped over the assembly and screwably tightened. As the U-shaped portion 16 of the ring 12 is forced into the annular recess 70, the conical end of the cathode 58 ruptures the fragile plastic cup 28 and the gelled electrolyte flows down into the electrolyte chamber 64, thus establishing electrolytic continuity between the cathode 58 and anode 62. As the tightening of the cap 56 on the housing 50 proceeds, the membrane 30 is drawn tightly down over the cathode 58 by the O-ring 78 and the U-shaped portion 18 of the ring 12 is forced to seal against the gasket 72. The sensing assembly is now ready for use.

In the event that it is desired to provide a carbon dioxide sensing assembly according to the present invention, the structure of the cap, capsule and electrode assembly would be the same with the exception that a glass electrode would replace the glass tube 60 and cathode 58 as the centrally located sensing or electrically active element and a silver-silver chloride reference electrode would replace the anode 62 as is well known to those skilled in the art. The end of the glass electrode would serve to fracture the plastic cup 28 and release the electrolyte. For this purpose, the end of the glass electrode could be rounded or provided with a point if desired, although the glass electrodes presently available in this type sensing device are satisfactory for this purpose.

As can be seen from the above description, an electrode assembly has been provided that may easily and quickly be charged or recharged with a fresh supply of electrolyte, the entire operation requiring only a few seconds and no particular degree of skill or dexterity. The recharge capsule of the present invention is simple in construction and easy to store so that any required number may be made readily available for use. The use of the invention also simplifies and reduces the cost of the initial construction of the sensing assemblies. Although the invention has been completely described and illustrated in connection with an oxygen sensor, it should be apparent to one skilled in the art that it may readily be used with any other similar sensor within the scope of this invention, as pointed out above.

The invention may be embodied in other specific form not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device for use in electrode assemblies of the type used to determine the partial vapor pressure of a gas in a medium, comprising: a first annular member, said member being provided with an annular recess therein; a flexible puncturable plastic cup; a membrane selectively permeable to said gas; means securing said cup to said membrane to form an enclosed cavity; said cavity containing an electrolyte; said cup having a rim portion positioned in said annular recess; said rim portion itself having an annular recess therein; said membrane having a portion thereof positioned in said annular recess of said rim portion and said securing means comprising a second annular member, said second annular member frictionally fitted into said annular recess of said rim portion and bearing against said portion of said membrane whereby said membrane is fixedly attached to said cup.

2. In a sensing device for determining the partial vapor pressure of a gas present in a medium, the combination comprising:

an electrode assembly having first and second electrodes spaced apart to define an electrolyte space therebetween, said first electrode having a portion thereof extending forwardly of said second electrode;
a cap mounted on said electrode assembly and having an aperture therein aligned with said first electrode;
a capsule containing electrolyte positioned between said cap and said electrode assembly, said capsule having a membrane selectively permeable to said gas whose partial pressure is to be determined disposed adjacent to said aperture and a flexible rupturable portion adjacent to said first electrode, whereby said rupturable portion is adapted to be ruptured by said first electrode upon relative movement of the latter toward said cap.

3. A sensing device as set forth in claim 2 wherein said cap includes means positioning said membrane tightly over said first electrode.

4. A method for replacing the electrolyte of a sensing device for determining the partial vapor pressure of a gas present in a medium, said device including an electrode assembly having an electrolyte space defined by a first electrode spaced from a second electrode comprising the steps of:

provided a capsule containing electrolyte and having a flexible rupturable portion and a membrane selectively permeable to the gas whose partial pressure is to be determined;

positioning said capsule adjacent to said electrode assembly with said rupturable portion contacting said first electrode;

enclosing said capsule with an electrode cap; and simultaneously joining said cap to said electrode assembly and rupturing said capsule by forcing said capsule against said first electrode whereby said electrolyte in said capsule flows into said electrolyte space.

References Cited by the Examiner

UNITED STATES PATENTS

| | | | |
|---|---|---|---|
| 2,913,386 | 11/59 | Clark | 204—195 |
| 2,935,547 | 5/60 | Kordesch | 136—90 |
| 3,000,805 | 9/61 | Carritt et al. | 204—195 |
| 3,046,786 | 7/62 | Tessem | 204—195 |
| 3,098,813 | 7/63 | Beebe et al. | 204—195 |
| 3,100,164 | 8/63 | Solomon et al. | 136—90 |

FOREIGN PATENTS

| | | |
|---|---|---|
| 71,132 | 3/59 | France. |
| 1,058,112 | 5/59 | Germany. |
| 773,752 | 5/57 | Great Britain. |
| 525,404 | 3/55 | Italy. |

JOHN H. MACK, *Primary Examiner.*

JOHN R. SPECK, WINSTON A. DOUGLAS, *Examiners.*